United States Patent [19]

Tardif et al.

[11] Patent Number: 5,454,932
[45] Date of Patent: Oct. 3, 1995

[54] CASSETTE DISPLAY CASE

[75] Inventors: Pierre Tardif, Longueuil; Eric Benoit, Montreal; Yvan LaPorte, Longueuil; Bertrand Racine, LaSalle; Alain Cayouette, Montreal, all of Canada

[73] Assignee: Trimark Molded Products, Inc., Montreal, Canada

[21] Appl. No.: 284,071

[22] Filed: Dec. 10, 1993

Related U.S. Application Data

[63] Continuation-in-part of Ser. No. 118,753, Sep. 10, 1993, abandoned.

[51] Int. Cl.$^6$ .................................................. B65D 85/672
[52] U.S. Cl. .................. 206/387.1; 206/1.5; 220/348; 220/351
[58] Field of Search .................. 206/1.5, 45.31, 206/45.34, 387.1, 387.12; 220/345, 348, 351

[56] References Cited

U.S. PATENT DOCUMENTS

| | | | |
|---|---|---|---|
| 3,110,436 | 11/1963 | Wagner | 220/348 |
| 3,441,165 | 4/1969 | Zampichelli | 220/345 |
| 3,933,240 | 1/1976 | Humble | 206/1.5 |
| 4,567,983 | 2/1986 | Morris | 206/387 |
| 4,627,531 | 12/1986 | Clemens | 220/351 |
| 4,921,097 | 5/1990 | Finke et al. | 206/387 |
| 4,987,999 | 1/1991 | Hehn | 206/387 |
| 5,085,322 | 2/1992 | Lax | 206/387 |
| 5,211,287 | 5/1993 | Weisburn et al. | 206/387 |
| 5,277,308 | 1/1994 | Finke et al. | 206/45.31 |

*Primary Examiner*—David T. Fidei
*Attorney, Agent, or Firm*—Samuel Meerkreebs

[57] ABSTRACT

A bottom open display case for jacketed cassettes wherein the jacket is retained in the display case which itself is of transparent plastics material. A base is attached to the bottom end of the display case and is slidable laterally from a closed position to an open position where an opening in the base aligns itself with the cassette in the display case allowing the cassette to be removed from the display case. A flexible tab on an end wall of the display case acts as a spring to return the base to its initial closed position where it is out of alignment with the cassette in the display case.

6 Claims, 4 Drawing Sheets

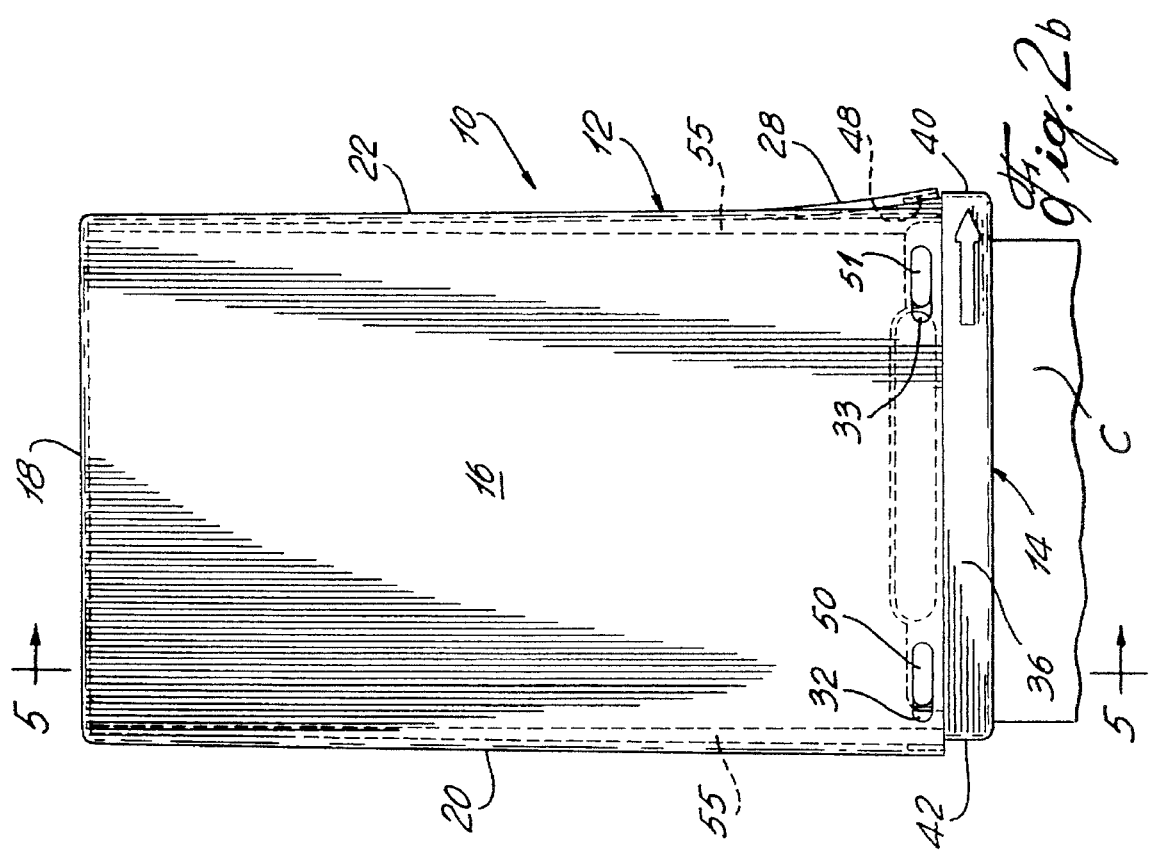
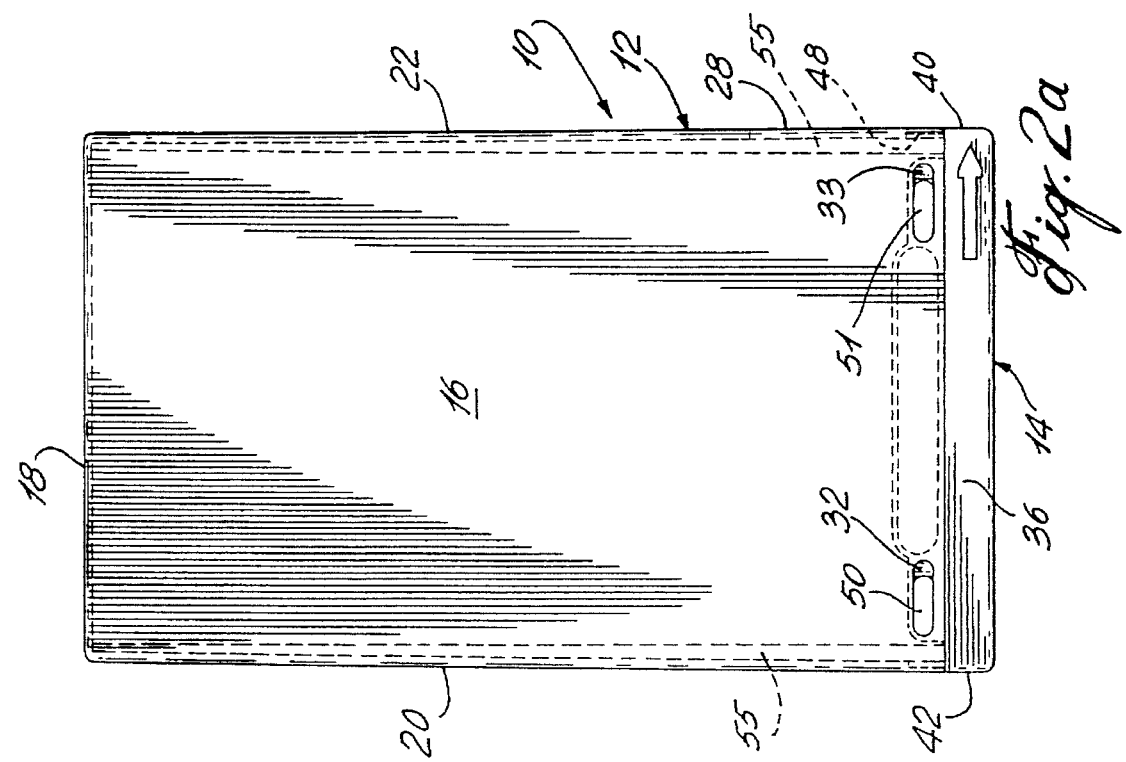

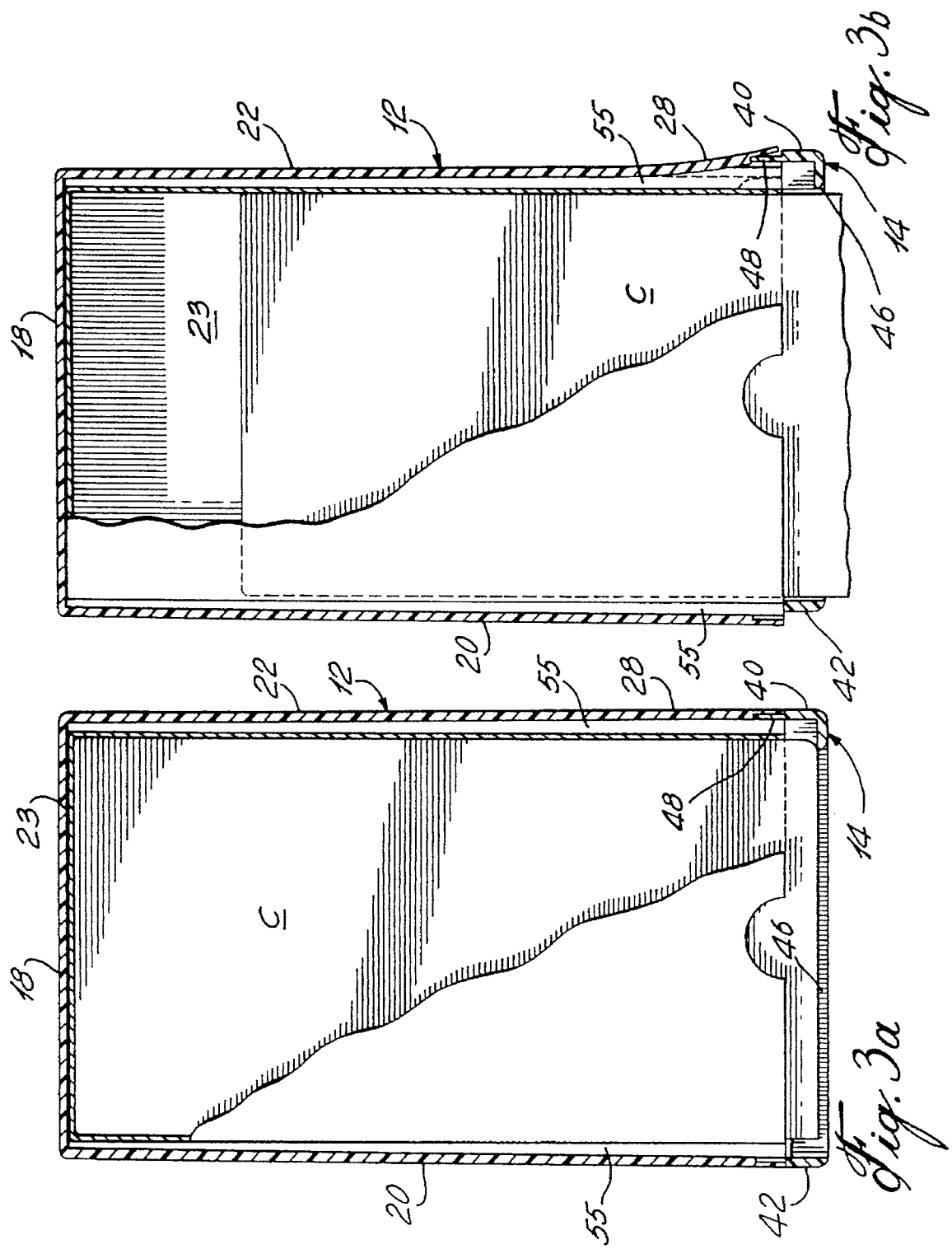

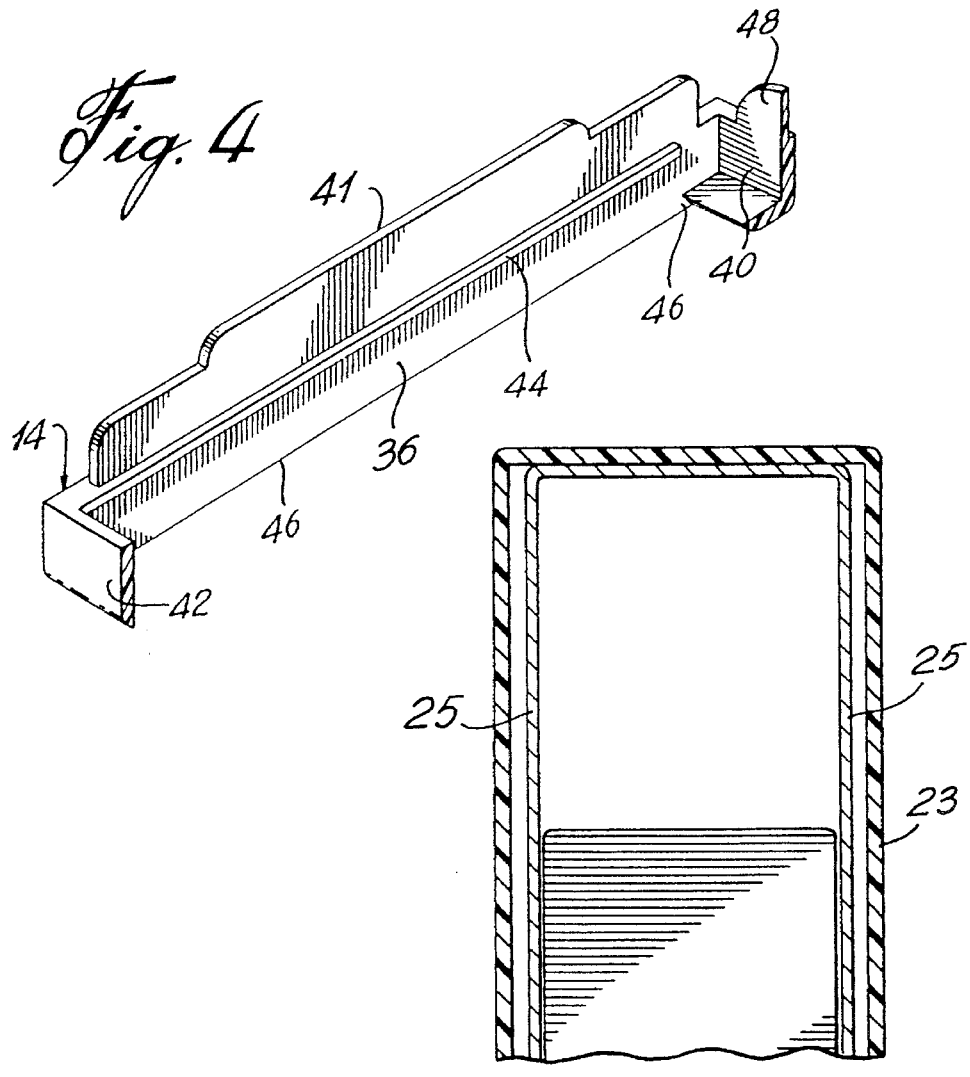
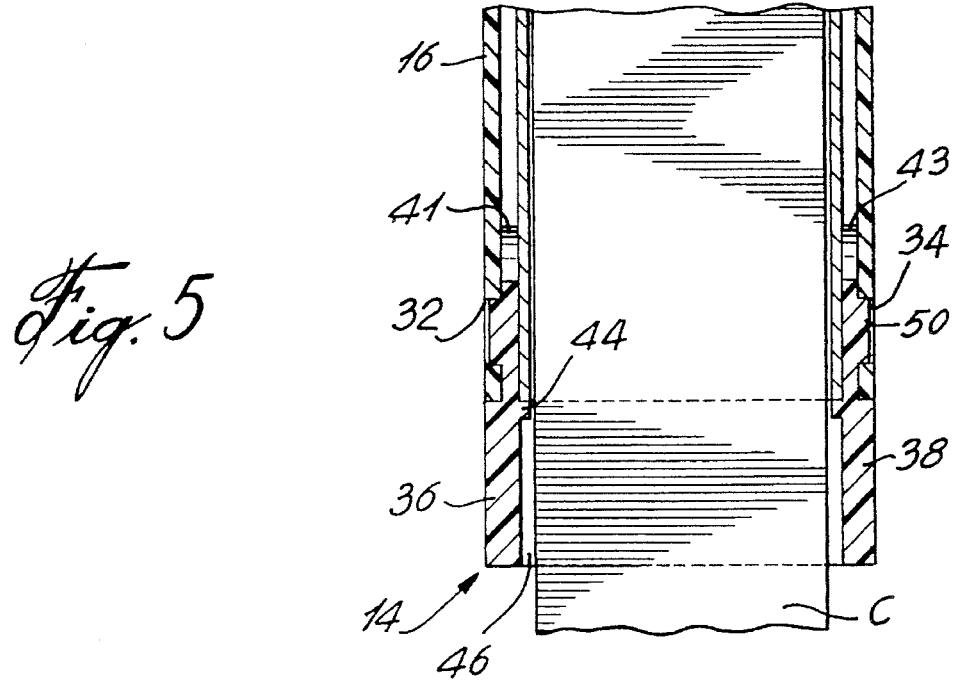

CASSETTE DISPLAY CASE

This application is a Continuation-in-part of application Ser. No. 08/118,753, filed Sep. 10, 1993 and now abandoned.

BACKGROUND OF THE INVENTION

1. Field of the Invention

The present invention relates generally to display containers and more particularly to display cases for jacketed video cassettes.

2. Background Art

U.S. Pat. Nos. 4,921,097, Finke et al, issued May 1, 1990, and 5,085,322, Lax, issued Feb. 4, 1992, show bottom load display cases for video cassettes of the VHS type. The purpose of these display cases is to store a jacketed video cassette while displaying the promotional and descriptive intelligence normally found on the jacket of a video cassette. The display case is made of a clear transparent rigid material and the jacket of the video cassette is retained within the casing by various locking means. The video cassette can be removed from the bottom of the casing and jacket, while the jacket remains in the casing and a closure-type device is provided at the open end of the casing for retaining or releasing the video cassette within the casing.

SUMMARY OF INVENTION

It is an aim of the present invention to provide a rigid transparent bottom load display casing which is an improvement over present bottom load display cases such as described in the above patents.

A construction in accordance with the present invention comprises a display case in the form of a sleeve having front, rear, end and top walls, and a bottom opening, the front and rear walls having parallel bottom edges defining the bottom opening with at least one end wall having a bottom edge, the bottom opening being shaped to receive a jacketed cassette to be stored. A base member engages the bottom edges of the casing, the base member has an opening defined to receive the cross-sectional outline of the cassette to be stored in order to allow the cassette to pass into or out of the casing when the base is in an open position while the jacket of the cassette is retained in the casing and to prevent the cassette from moving out of the casing when the base is in a closed position. At least a portion of the base is slidable laterally relative to the axis of the casing, between a base open position and a base closed position and spring means is provided for urging the portion of the base towards the base closed position.

BRIEF DESCRIPTION OF DRAWINGS

The invention will be better understood by an examination of the following description, together with the accompanying drawings, in which:

FIGS. 2a and 2b are front elevations of the embodiment of the container shown in FIG. 1 but in different operative positions, wherein FIG. 2a shows the closed position and FIG. 2b shows the open position;

FIGS. 3a and 3b are longitudinal cross-sections taken through the casing showing the cassette in the casing in FIG. 3a while the case is in a closed position and being withdrawn from the casing in FIG. 3b with the base in an open position;

FIG. 4 is a fragmentary perspective view of a portion of the base in accordance with the embodiment of FIG. 1; and FIG. 5 is a fragmentary cross-sectional view of a detail of the embodiment taken along line 5—5 of FIG. 2b.

DESCRIPTION OF PREFERRED EMBODIMENTS

Figure 1:
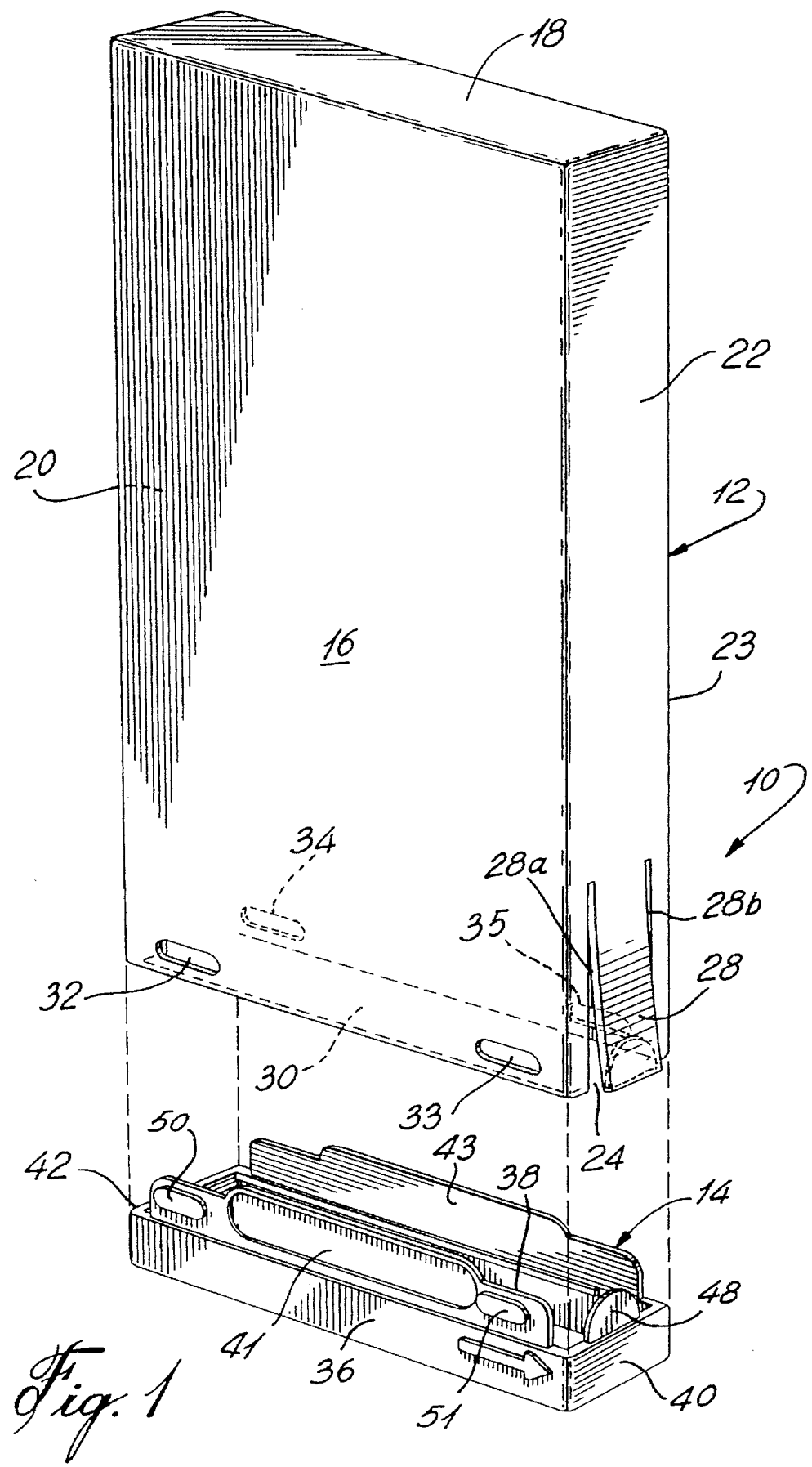
FIG. 1 is an exploded perspective view of an embodiment of the present invention.

Referring now to the drawings, a display casing 10 is illustrated having a transparent sleeve 12 and a base 14.

The transparent sleeve 12 includes a front wall 16, a top wall 18, end walls 20 and 22 and a rear wall 23. The video cassette C is generally shipped in a chipboard jacket 25. Jacket 25 would preferably be a bottom-loaded sleeve on which description and graphics promote the pre-recorded program contained on the tape. The Jacket 25 would be inserted into the sleeve 12 whereby the promotional graphics would be seen through transparent walls 16, 18, 20 and 22.

The sleeve 12 defines a bottom opening 30 and pairs of opposed slots 32, 34 and 33, 35 located in the front and rear walls 16 and 23 in aligned relationship. A resilient tab 28 is formed, in end wall 22 for instance, by means of parallel slits 24 and 26.

A separable base 14 includes front and rear walls 36 and 38, and end walls 40 and 42. Upper portions 41, 43 of the front and rear walls 36 and 38 are stepped inwardly to allow the upper portion of the base 14 to be inserted within the sleeve 12. Lugs 50, 51 are provided on the front wall 36 and similar lugs are located on the rear wall 38. Ribs 44, as shown in FIGS. 4 and 5, are provided on the inside surfaces of walls 36 and 38 in order to engage the bottom edge of the jacket 25 preventing the jacket 25 from sliding out of the casing 10 when the cassette C is removed.

When the base 14 is inserted partially into the sleeve 12, the lugs 50 and 51 become aligned with slots 30 and 33, while the opposed lugs on the wall 38 would engage the slots 34 and 35 on the rear wall 23. The lugs 50, 51 are shorter in length than the slots 32, 33, 34 or 35, to allow the base to slide laterally relative to the sleeve 12. In the present embodiment, the base 14 slides in an axis passing through the planes of the end walls 20, 22 and the sliding movement is limited by the travel of the lugs 50 and 51 within the slots 32, 33, 34 and 35.

End wall 22 includes a pair of parallel slits 28a, 28b defining spring member 28. An upstanding tab 48 is provided on the end wall 40 of the base 14 and this tab 48 engages the spring member 28 on the end wall 22. When the base 14 moves from a closed position, as shown in FIGS. 2a, 3a, in a lateral direction towards end wall 22, the tab 48 will press against resilient tab 28.

The spring member 28 urges against the tab 48 to return the base 14 to its closed position from the open position as shown in FIGS. 2b, 3b.

The base 14 has an opening 46 which is designed to allow the cassette C to pass therethrough. The bottom opening 30 of sleeve 12 is adapted to receive the jacket 25 and cassette C. Ribs 55 are located on the interior of the end walls 20 and 22 in order to align the cassette C with the opening 46 when the base 14 is in the open position.

In a closed position, the opening 46 of the base 14 is out of alignment with cassette C as shown in FIGS. 2a and 3a, thus preventing the cassette C from dropping through the bottom opening 30. As well, the spring 28 maintains the base 14 in its closed position with the opening 46 out of alignment with the cassette C until manual pressure is applied to slide the base 14 against spring 48 to the open position. The cassette C will then be aligned with opening 46, and the cassette C will be allowed to drop through the base 14 as shown in FIGS. 2b, 3b.

When it is required to assemble the display casing 10, the base 14 is separate from the sleeve 12. The jacket 25 is fitted into the sleeve 12. The base 14 is then engaged, to the bottom spring 30 of the sleeve 12, by inserting the front and rear walls 36 and 38 into the opening 30 until the lugs 50, 51 engage in the slots 32, 33, 34, 35. The bottom edge of the jacket 25 will then engage the ribs 44 in the base 14.

Many other modifications of this invention are contemplated, including moving only a portion of the base to reduce and enlarge the opening and the base could be constructed so that it slides laterally in the axis of the front and rear walls 16 and 23.

We claim:

1. A display case for a combination cassette and opened bottom jacket, the case comprising a substantially rigid transparent sleeve having front, rear end, and top walls and a bottom opening; the front and rear walls having parallel bottom edges and at least one end edge defining the bottom opening; the bottom opening being shaped to receive a cassette to be stored; means for retaining the jacket while permitting the cassette to be removed; a base member adapted to engage the bottom edges of the case; the base member having an opening defined to accommodate the outline of the cross section of the cassette in order to allow the cassette to slide into or out of the case along the major axis of the case when the base is in an open position and to prevent the cassette from moving out of the case when the base is in a closed position, at least a portion of the base being slidable laterally relative to the major axis of the case between the base open position and the base closed position, and spring means urging the portion of the base towards the base closed position.

2. A display case as defined in claim 1, wherein the base is a one-piece molded plastics member and said opening is defined as a through opening in the member and track means are provided on the bottom edges of the side walls and the base member to allow the base member to slide laterally a limited distance against the urging of the spring means from a bottom closed position where the opening in the base is out of alignment with the cassette in the display case and the open position where the opening in the base is in alignment with the cassette in the display case.

3. A display case as defined in claim 2, wherein the track means includes slots in the front and rear walls of the case in the area of the bottom edges, and the base includes corresponding front and rear panels with lugs extending in the slots provided in the front and rear walls of the display case whereby the case can slide laterally relative to the display case.

4. A display case as defined in claim 3, wherein the display case is made of a relatively rigid plastics material and the said end wall includes a pair of slits extending upwardly from the bottom edge to define a flexible tab, means are provided on the base to engage the flexible tab so that when the case is slid from the closed position to the open position it presses against the flexible tab and the end wall such that the tab urges against the base to return the base to its initial close position.

5. A display case as defined in claim 2, wherein the end walls of the display case include ribs extending parallel to the axis of the case and the distance between the ribs on opposite end walls corresponds to the width of a jacketed cassette.

6. A display case as defined in claim 2, wherein the base includes at least one rib extending laterally of the axis of the case and engages the jacket which includes a front and rear walls and bottom edges such that a bottom edge of the jacket is engaged by the rib, and the dimension of the rib is such as to allow the cassette to be slid into the display case through the opening in the base when the base is in an open position.

* * * * *